(12) United States Patent
Wang et al.

(10) Patent No.: US 8,862,857 B2
(45) Date of Patent: Oct. 14, 2014

(54) DATA ACCESS PROCESSING METHOD AND APPARATUS

(75) Inventors: Wei Wang, Hangzhou (CN); Xiaofeng Zhang, Hangzhou (CN)

(73) Assignee: Huawei Technologies Co., Ltd., Shenzhen (CN)

(*) Notice: Subject to any disclaimer, the term of this patent is extended or adjusted under 35 U.S.C. 154(b) by 321 days.

(21) Appl. No.: 13/340,170

(22) Filed: Dec. 29, 2011

(65) Prior Publication Data

US 2012/0272022 A1    Oct. 25, 2012

Related U.S. Application Data

(63) Continuation of application No. PCT/CN2011/072989, filed on Apr. 19, 2011.

(51) Int. Cl.
- *G06F 12/02* (2006.01)
- *G06F 9/54* (2006.01)
- *G06F 12/10* (2006.01)
- *H04L 29/06* (2006.01)

(52) U.S. Cl.
CPC ............ *G06F 9/545* (2013.01); *G06F 12/1009* (2013.01); *H04L 29/06* (2013.01)
USPC .................................. 711/206; 711/E12.027

(58) Field of Classification Search
None
See application file for complete search history.

(56) References Cited

U.S. PATENT DOCUMENTS

| | | |
|---|---|---|
| 7,506,096 B1 | 3/2009 | Koryakin et al. |
| 2008/0092138 A1 | 4/2008 | Chung et al. |

FOREIGN PATENT DOCUMENTS

| | | |
|---|---|---|
| CN | 101477496 A | 7/2009 |
| CN | 101604263 A | 12/2009 |
| GB | 2396930 A | 7/2004 |
| WO | WO 2011/107040 A2 | 9/2011 |

OTHER PUBLICATIONS

Extended European Search Report issued in corresponding European Patent Application No. 11750193.2, mailed May 22, 2012.
Chang et al., "Performance Analysis of a CC-NUMA Operating System" IEEE 2001.
International Search Report issued in corresponding PCT Patent Application No. PCT/CN2011/072989, mailed Nov. 3, 2011.

*Primary Examiner* — Charles Rones
*Assistant Examiner* — Ryan Dare
(74) *Attorney, Agent, or Firm* — Brinks Gilson & Lione

(57) ABSTRACT

A data access processing method and apparatus, the method comprising: copying a kernel code and a global descriptor table on a memory of each of nodes respectively (101); making base addresses of kernel code segments on the respective nodes in the global descriptor table respectively point to linear addresses of the kernel code corresponding to the respective nodes based on a virtual address of the kernel code (102); and recording a mapping relation between the linear addresses of the kernel code corresponding to the respective nodes and physical addresses of the respective nodes in a kernel page table respectively, to enable a process to access the kernel code locally in the respective nodes (103). The apparatus comprises a copying module (401), a modifying module (402) and a recording module (403).

8 Claims, 4 Drawing Sheets

---

Copying a kernel code and a Global Descriptor Table (GDT) on a memory of each of nodes respectively — 101

Making base addresses of kernel code segments on the respective nodes in the global descriptor table respectively point to linear addresses of the kernel code corresponding to the respective nodes based on a virtual address of the kernel code — 102

Recording a mapping relation between the linear addresses of the kernel code corresponding to the respective nodes and physical addresses of the respective nodes in a kernel page table respectively, to enable a process to access the kernel code locally in the respective nodes — 103

DATA ACCESS PROCESSING METHOD AND APPARATUS

CROSS-REFERENCE TO RELATED APPLICATIONS

This application is a continuation of International Application No. PCT/CN2011/072989, filed Apr. 19, 2011, which is hereby incorporated by reference in its entirety.

FIELD OF THE APPLICATION

The embodiments of the present application relate to communication technologies, and more specifically to a data access processing method and apparatus.

BACKGROUND OF THE APPLICATION

Non Uniform Memory Access Architecture (hereinafter briefly referred to as NUMA) can satisfy demands for high performance computation based on its advantage of scalability, and has increasingly wide applications on medium and high end servers. However, NUMA remote-end access delay is a bottleneck in improving system performance, and especially in the case of multiple kernels and heavy kernels, there are numerous nodes and the remote-end access delay will increase as the number of nodes increases. With respect to data frequently accessed by the system, such as kernel code and kernel read-only data, normally only one copy of the data is stored in a system, and when a process running at a remote end needs to be switched to the kernel, the remote-end access delay will become one of the key factors that influence the performance.

In order to solve the aforementioned problem of remote-end access delay, in the prior art, a copy of a kernel code is saved in each of the nodes so that an access to the kernel code becomes an access to a local memory, wherein a paging technology implementation mechanism is employed to map a same linear address to different physical addresses and record the mapping relation on the respective nodes in respective kernel page tables. Once there is a process running on a node, a kernel page table portion on the node will be synchronized to a page table of the process, thereby enabling the process accessing the local kernel code and read-only data.

However, when making the present application, the inventors find that the prior art has at least the following drawbacks: since the process needs to be synchronized with the kernel page tables on the respective nodes, when the process migrates among the nodes, the contents of its page table needs to be frequently modified, thereby influencing the system performance.

SUMMARY OF THE APPLICATION

The embodiments of the present application provide a data access processing method and apparatus which implement multiple copies of a kernel by using a segmentation technology, to avoid frequently modifying contents of a page table when a process migrates among nodes, thereby improving system performance.

In order to achieve the above-mentioned object, the embodiments of the present application provide a data access processing method, comprising:

copying a kernel code and a Global Descriptor Table (GDT) on a memory of each of nodes respectively;

making base addresses of kernel code segments on the respective nodes in the global descriptor table respectively point to linear addresses of the kernel code corresponding to the respective nodes based on a virtual address of the kernel code; and recording a mapping relation between the linear addresses of the kernel code corresponding to the respective nodes and physical addresses of the respective nodes in a kernel page table respectively, to enable a process to access the kernel code locally in the respective nodes.

The embodiments of the present application provide a data access processing apparatus, comprising:

a copying module for copying a kernel code and a global descriptor table on a memory of each of nodes respectively;

a modifying module for making base addresses of kernel code segments on the respective nodes in the global descriptor table respectively point to linear addresses of the kernel code corresponding to the respective nodes based on a virtual address of the kernel code; and a recording module for recording a mapping relation between the linear addresses of the kernel code corresponding to the respective nodes and physical addresses of the respective nodes in a kernel page table respectively, to enable a process to access the kernel code locally in the respective nodes.

The present embodiments provide a data access processing method and apparatus, which copy a kernel code and a GDT on each of the nodes, modify base addresses of the kernel code segments on the respective nodes in the GDT to different linear addresses, and write a mapping relation between the linear addresses and physical addresses of the nodes in a kernel page table, to enable a process to access the kernel code locally in the respective nodes; the present embodiments realize multiple copies of the kernel using the segmentation technology, and when the process accesses the kernel code, the embodiments can directly obtain different linear addresses according to the contents of the GDT on the nodes, which are in turn mapped to different physical addresses based on the paging mechanism, without the necessity of synchronizing the kernel page tables on the nodes and the page table of the process, so as to avoid frequently modifying the contents of the page table when the process migrates among the nodes, thereby improving system performance.

BRIEF DESCRIPTION OF THE DRAWINGS

In order to illustrate more clearly the embodiments of the present application or the technical solutions in the prior art, a brief introduction to the accompanying drawings necessary for the description of the embodiments or the prior art will be given below. Apparently, the accompanying drawings described below illustrate some embodiments of the present application, and a person skilled in the art can obtain further drawings based on these accompanying drawings without creative efforts.

DETAILED DESCRIPTION OF THE EMBODIMENTS

In order to make the objects, technical solutions and advantages of the embodiments of the present application clearer, the technical solutions in the embodiments of the present application will be described below with reference to the accompanying drawings of the embodiments of the present application in a clear and complete way. Obviously, the embodiments described are a part of the embodiments of the present application but not all the embodiments. All other embodiments obtained by a person skilled in the art based on the embodiments of the present application without paying creative efforts will fall within the scope of the present application.

Figure 1:
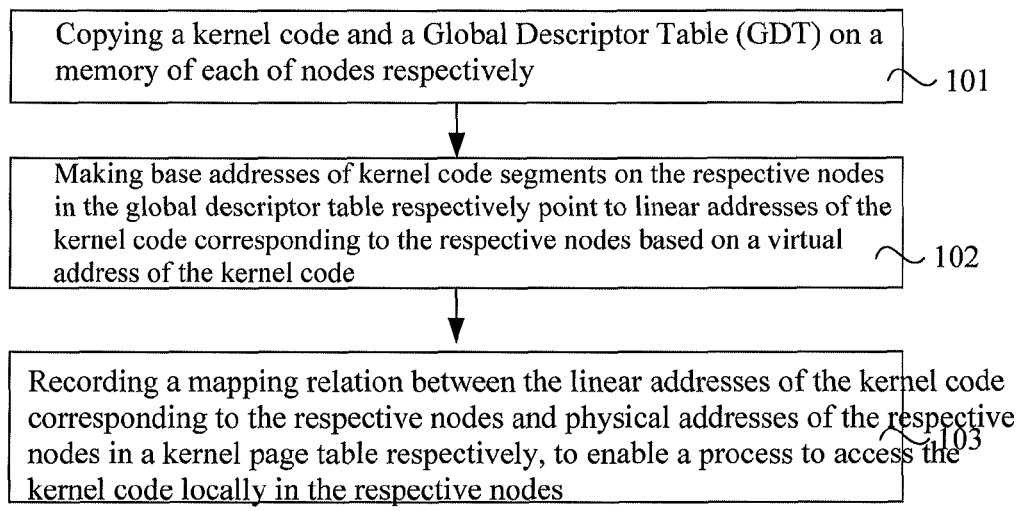
FIG. 1 is a flowchart of Embodiment 1 of a data access processing method of the present application.

FIG. 1 is a flowchart of Embodiment 1 of a data access processing method of the present application. As shown in FIG. 1, the present embodiment provides a data access processing method, which may specifically comprise the following steps.

Step 101: Copying a kernel code and a Global Descriptor Table (GDT) on a memory of each of nodes respectively.

Regarding a kernel code that is frequently accessed by the system, in order to enable an access to the kernel code by a process running at a remote end and eliminate remote-end access delay, firstly an application is made for a memory on each of the nodes, and the kernel code is copied on the memory of each of the nodes, so that a copy of the kernel code is saved on each of the nodes. Moreover, in the present embodiment, a Global Descriptor Table (hereinafter briefly referred to as GDT) is copied on each of the nodes, respectively, the GDT having recorded therein base addresses of kernel code segments on the respective nodes (the base addresses of the kernel code segments here represent relative offsets of the locations in the GDT of the kernel codes on the respective nodes), that is, the GDT saves relevant address information of the kernel code on all the nodes.

Step 102: Making base addresses of kernel code segments on the respective nodes in the global descriptor table respectively point to linear addresses of the kernel code corresponding to the respective nodes based on a virtual address of the kernel code.

After completing the copying of the kernel code and the GDT on the respective nodes, the base addresses of the kernel code segments in the GDT of the respective node are respectively modified. Specifically, based on a virtual address of the kernel code, the base addresses of the kernel code segments on the respective nodes in the GDT are respectively made to point to linear addresses of the kernel code corresponding to the respective nodes. Here, the linear addresses of the kernel code corresponding to the respective nodes may be generated based on the virtual address of the kernel code and the base addresses of the kernel code segments on the respective nodes. Since the base addresses of the kernel code segments on the respective nodes differ from each other, different linear addresses are generated. In this step, the virtual address of the kernel code is mapped to different linear addresses, and the base addresses of the kernel code segments on the respective nodes in the GDT are modified to the linear addresses. Thus, the GDT records therein different linear addresses to which the respective nodes correspond, that is, the address information of the kernel code on the respective nodes is shown in the GDT in form of segments, unlike the same linear address in the prior art.

Step 103: Recording a mapping relation between the linear addresses of the kernel code corresponding to the respective nodes and physical addresses of the respective nodes in a kernel page table respectively, to enable a process to access the kernel code locally in the respective nodes.

After obtaining different linear addresses corresponding to different nodes, the linear addresses of the kernel code corresponding to the respective nodes and physical addresses of the respective nodes are subjected to a mapping process, and the mapping relation between the linear addresses and the physical addresses are recorded in the kernel page table, thereby realizing multiple copies of the kernel, to enable the process to access the kernel code locally in the respective nodes.

Further, the data access processing method provided by the present embodiment may also comprise: filling a base address of the GDT on the respective nodes into a Global Descriptor Table Register (hereinafter briefly referred to as GDTR) in the respective nodes respectively. After copying the GDT on the memory of the respective nodes and mapping the base addresses of the code segments in the GDT to different linear addresses, the base address of the GDT of the respective nodes is written into the GDTR of the respective nodes, for acquisition and use in a subsequent data access.

The present embodiment provides a data access processing method, which copies a kernel code and a GDT on each of the nodes, modifies base addresses of the kernel code segments on the respective nodes in the GDT to different linear addresses, and writes a mapping relation between the linear addresses and physical addresses of the nodes in a kernel page table, to enable a process to access the kernel code locally in the respective nodes; the present embodiment realizes multiple copies of the kernel using the segmentation technology, and when the process accesses the kernel code, the embodiment can directly obtain different linear addresses according to the contents of the GDT on the nodes, which are in turn mapped to different physical addresses based on the paging mechanism, without the necessity of synchronizing the kernel page table on the nodes and the page table of the process, so as to avoid frequently modifying the contents of the page table when the process migrates among the nodes, thereby improving system performance.

Figure 2:
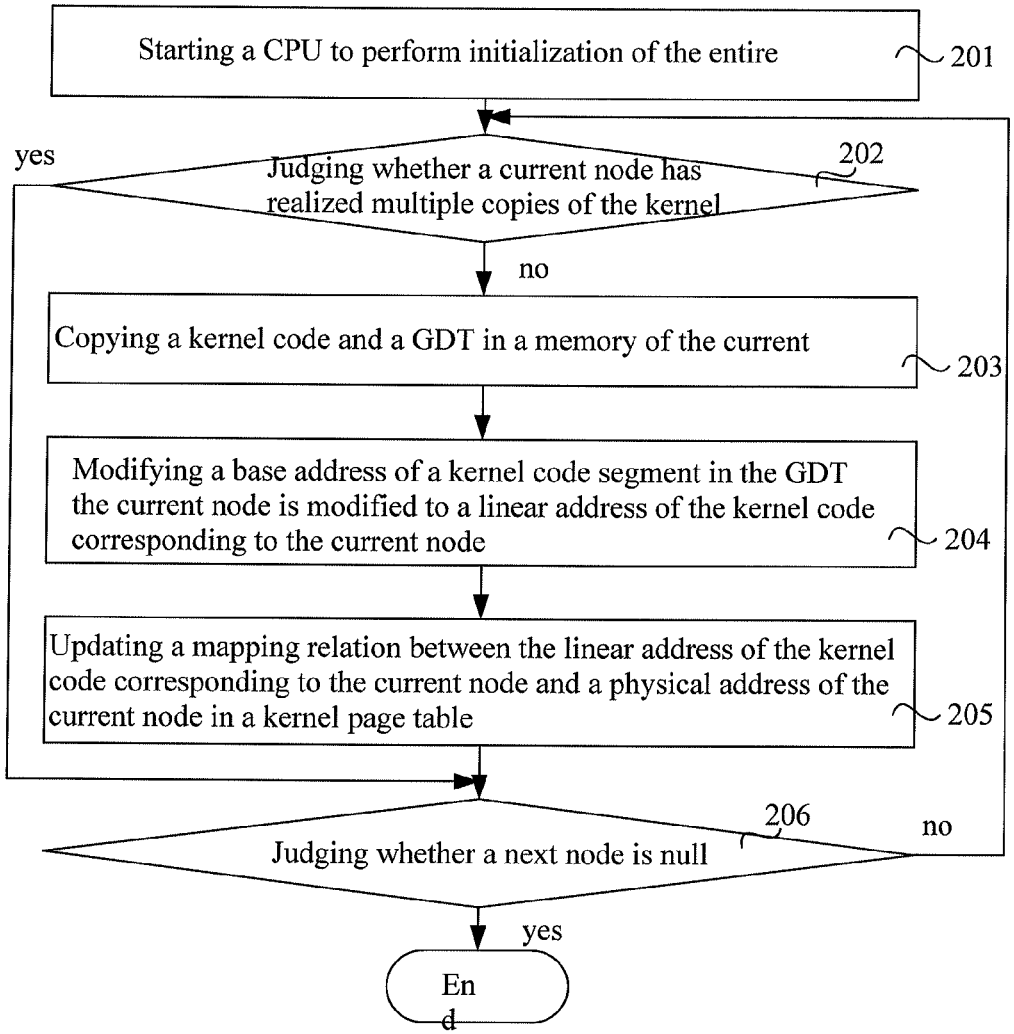
FIG. 2 is a flowchart of Embodiment 2 of the data access processing method of the present application.

FIG. 2 is a flowchart of Embodiment 2 of a data access processing method of the present application. As shown in FIG. 2, this embodiment provides a data access processing method, which may specifically comprise the following steps.

At step 201, a Centre Processing Unit (hereinafter briefly referred to as CPU) is started to perform initialization of the entire system.

At step 202, it is judged whether a current node has realized multiple copies of the kernel, and if yes, step 206 is executed; otherwise, step 203 is executed.

In the present embodiment, when realizing multiple copies of the kernel, initialization of multiple copies of the kernel is performed for the respective nodes sequentially. At this step, it is judged whether a current node has realized multiple copies of the kernel, and if yes, step 206 is executed to proceed to the initialization of multiple copies of the kernel for the next node; otherwise, step 203 is executed and the initialization of the multiple copies of the kernel is performed on the current node.

At step 203, a kernel code and a GDT are copied in a memory of the current node.

An application is made for an adequate memory on the current node, a copy of the kernel code and a copy of the GDT are made in the newly applied memory on the current node, and a base address of the GDT is filled into a GDTR of the current node.

At step 204, a base address of a kernel code segment in the GDT of the current node is modified to a linear address of the kernel code corresponding to the current node.

After completing the copying of the kernel code and the GDT on the current node, the base address of the kernel code segment in the GDT of the current node is modified. Specifically, based on a virtual address of the kernel code, the base address of the kernel code segment in the GDT of the current node is made to point to the linear address of the kernel code corresponding to current node. At this step, the virtual address of the kernel code is mapped to a linear address corresponding to the current node, and the base address of the kernel code segment on the current node in the GDT is modified to the linear address.

At step 205, a mapping relation between the linear address of the kernel code corresponding to the current node and a physical address of the current node is updated in a kernel page table.

After obtaining the linear address corresponding to the current node, the linear address of the kernel code corresponding to the current node and the physical address of the current node are subjected to a mapping process, and the mapping relation between the linear address and the physical address is recorded in the kernel page table, thereby completing initialization of multiple copies of the kernel for the current node.

At step 206, it is judged whether a next node is null, and if yes, the flow is ended; otherwise, the next node is taken as the current node, and the flow returns to execute step 202.

After completing initialization of multiple copies of the kernel for a node, it is judged whether a next node is null, and if the next node is null, it indicates that the initialization of multiple copies of the kernel of the system has been performed, and then the flow is ended. If the next node is not null and there still exist other nodes for which initialization of multiple copies of the kernel has not been completed, then the next node is taken as a current node and the flow returns to step 202. Steps 202 to 206 are repeated, until the initialization of multiple copies of the kernel for all the nodes in the system are realized.

In the present embodiment, after having completed the initialization of multiple copies of the kernel for the respective nodes in the system, it is possible for the process to access locally the kernel code in the nodes. Specifically, when the process accesses the kernel code in a node, the present embodiment may further comprise the following steps. Firstly, according to the contents of the GDT on the node, the virtual address of the kernel code is mapped to the linear address of the kernel code corresponding to the node. In switching the process, since the hardware automatically extracts from the GDT a segment descriptor of a kernel code segment on the node of the kernel code accessed by the process and loads it into a code segment register, when the process accesses the code on the node, the virtual address of the kernel code can be directly mapped to the linear address corresponding to the node in accordance with the content of the GDT on the node. Next, after obtaining the linear address of the kernel code corresponding to the node, the mapping relation between the linear address and the physical address is looked up in the kernel page table, and the physical address corresponding to the linear address is obtained. Still next, the kernel code on the node is accessed in accordance with the physical address. After obtaining the local physical address of the kernel code in the node, the process can directly access the kernel code on the node according to the physical address.

Figure 3:
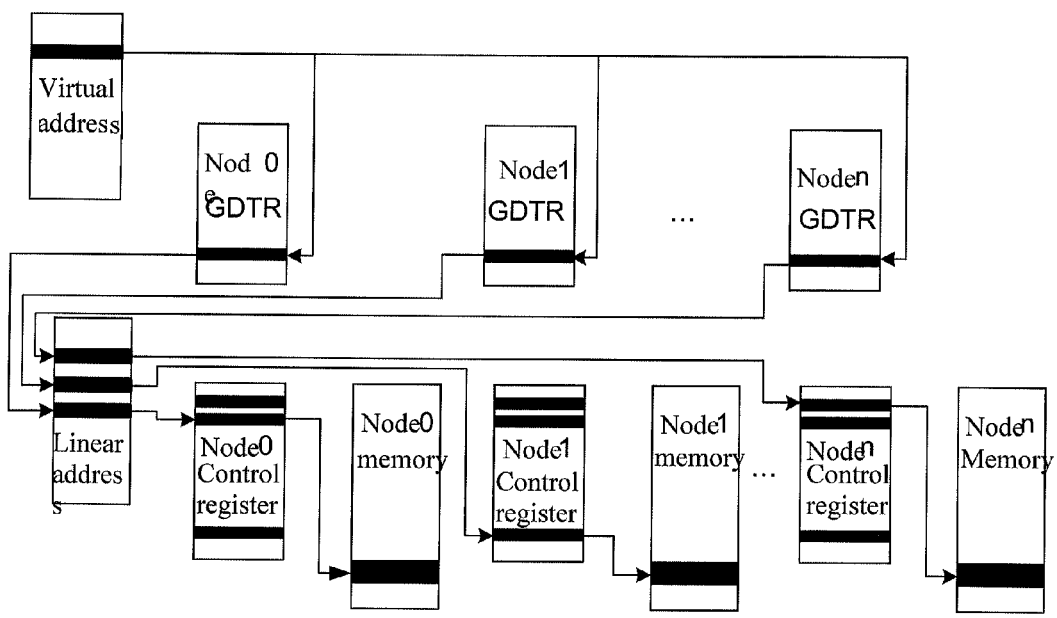
FIG. 3 is a schematic diagram illustrating the implementation of multiple copies of a kernel code using a segmentation technology in Embodiment 2 of the data access processing method of the present application.

FIG. 3 is a schematic diagram illustrating the implementation of multiple copies of a kernel code using a segmentation technology in Embodiment 2 of the data access processing method of the present application. As shown in FIG. 3, it is assumed that the system comprises a total of n+1 nodes, i.e., node 0, node 1, . . . , and node n. In the present embodiment, a kernel code and a GDT are respectively copied on a memory of the above-mentioned n+1 nodes, a base address of the GDT is recorded in a GDTR in the respective nodes, and a base address of a kernel code segment in respective GDTs is modified, which, as can be seen from FIG. 3, is respectively made to point to different linear addresses, thereby realizing segmentation of the linear address. Subsequently, a linear address of the kernel code on a certain node can be obtained according to a virtual address of the code and the GDT. A mapping relation between the linear addresses corresponding to the respective nodes and physical addresses of the nodes is written into a kernel page table, and subsequently, by looking up the mapping relation, it is possible to obtain the physical address corresponding to the linear address. The kernel code saved in a memory of the node can be accessed according to the physical address.

Further, when an interrupt application accesses a kernel code on a node, the present embodiment may further comprise the following steps. Firstly, an interrupt vector corresponding to the interrupt application is looked up in an interrupt vector table, the interrupt vector carrying a segment descriptor of the kernel code in the GDT on the node. When the interrupt application accesses the kernel code on a certain node, the system firstly looks up an interrupt vector corresponding to the interrupt application in an interrupt vector table, the interrupt vector containing a segment descriptor of a kernel code segment in the GDT, that is, the interrupt vector automatically pointing to the segment descriptor of the kernel code segment in the local node. Next, a linear address of the kernel code corresponding to the node is obtained according to a segment descriptor of the kernel code in the GDT on the node. Still next, after obtaining the linear address of the kernel code corresponding to the node, a mapping relation between the linear address and the physical address is looked up in a kernel page table to obtain the physical address correspond to the linear address. Finally, the kernel code on the node is accessed in accordance with the physical address. After obtaining the local physical address of the kernel code in the node, it is possible to enable the interrupt application to directly access the kernel code on the node according to the physical address.

The present embodiment provides a data access processing method, which copies a kernel code and a GDT on each of the nodes, modifies base addresses of the kernel code segments on the respective nodes in the GDT to different linear addresses, and writes a mapping relation between the linear addresses and physical addresses of the nodes in a kernel page table, to enable a process to access the kernel code locally in the respective nodes; the present embodiment realizes multiple copies of the kernel using the segmentation technology, and when the process accesses the kernel code, the embodiment can directly obtain different linear addresses according to the contents of the GDT on the nodes, which are in turn mapped to different physical addresses based on the paging mechanism, without the necessity of synchronizing the kernel page table on the nodes and the page table of the process, so as to avoid frequently modifying the contents of the page table when the process migrates among the nodes, thereby improving system performance.

A person skilled in the art can understand that all or part of the steps for carrying out the embodiments of the above method can be performed by program instruction related hardware, and the said program can be stored in a computer readable storage medium, and when being executed, the program executes the steps of the above embodiments of the method; and the said storage medium comprises various mediums that can store program code, such as a ROM, a RAM, a magnetic disk or an optical disk.

Figure 4:
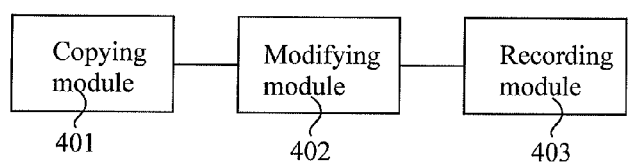
FIG. 4 is a structural diagram of Embodiment 1 of a data access processing apparatus of the present application.

FIG. 4 is a structural diagram of Embodiment 1 of a data access processing apparatus of the present application. As shown in FIG. 4, the present embodiment provides a data access processing apparatus, which can specifically execute respective steps in above Embodiment 1 of the method, the description of which is omitted here. The data access processing apparatus provided by the present embodiment may specifically comprise a copying module 401, a modifying module 402 and a recording module 403. The copying module 401 is used for copying a kernel code and a GDT on a memory of each of nodes respectively. The modifying module 402 is used for making base addresses of kernel code segments on the respective nodes in the GDT respectively point to linear addresses of the kernel code corresponding to the respective nodes based on a virtual address of the kernel code. The recording module 403 is used for recording a mapping relation between the linear addresses of the kernel code corresponding to the respective nodes and physical addresses of the respective nodes in a kernel page table respectively, to enable a process to access the kernel code locally in the respective nodes.

Figure 5:
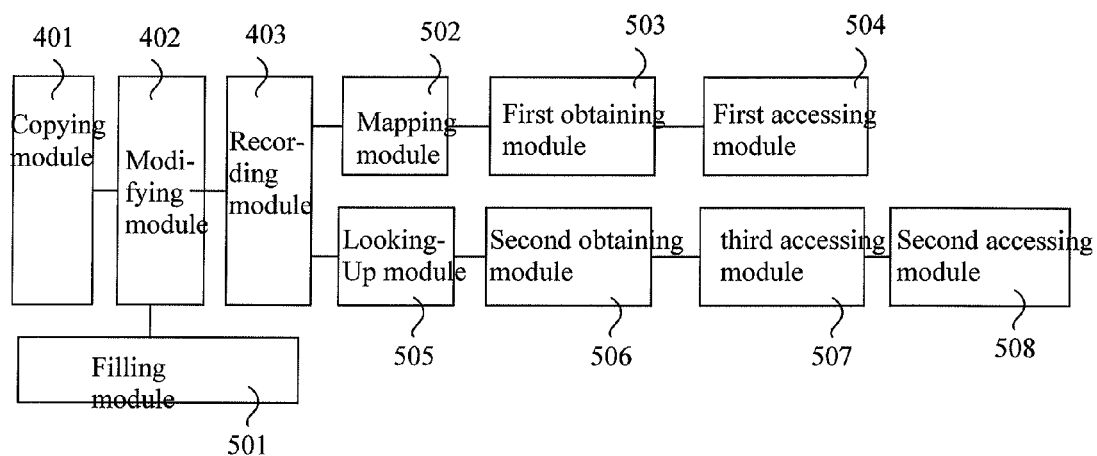
FIG. 5 is a structural diagram of Embodiment 2 of the data access processing apparatus of the present application.

FIG. 5 is a structural diagram of Embodiment 2 of the data access processing apparatus of the present application. As shown in FIG. 5, the present embodiment provides a data access processing apparatus, which can specifically execute respective steps in above Embodiment 2 of the method, the description of which is omitted here. The data access processing apparatus provided by the present embodiment, on the basis of what is shown in the above FIG. 4, may further comprise a filling module 501 which is used for filling a base address of a GDT on the respective nodes into a GDTR of the respective nodes respectively.

Further, the data access processing apparatus provided by the present embodiment may further comprise a mapping module 502, a first obtaining module 503 and a first accessing module 504. The mapping module 502 is used for, when a process accesses a kernel code on a node, mapping a virtual address of the kernel code to a linear address of the kernel code corresponding to the node according to the content of a GDT on the node. The first obtaining module 503 is used for obtaining a physical address corresponding to the linear address of the kernel code according to a mapping relation between the linear address of the kernel code corresponding to the node and the physical address of the node recorded in the kernel page table. The first accessing module 504 is used for accessing the kernel code on the node according to the physical address.

Further, the data access processing apparatus provided by the present embodiment may also comprise a looking-up module 505, a second obtaining module 506, a third obtaining module 507 and a second accessing module 508. The looking-up module 505 is used for, when an interrupt application accesses a kernel code on a node, looking up an interrupt vector to which the interrupt application corresponds from an interrupt vector table, the interrupt vector carrying a segment descriptor of the kernel code in a GDT on the node. The second obtaining module 506 is used for obtaining a linear address of the kernel code corresponding to the node according to the segment descriptor of the kernel code in the GDT on the node. The third obtaining module 507 is used for obtaining a physical address corresponding to the linear address of the kernel code according to a mapping relation between the linear address of the kernel code corresponding to the node and the physical address of the node recorded in the kernel page table. The second accessing module 508 is used for accessing the kernel code on the node according to the physical address.

The present embodiment provides a data access processing apparatus, which copies a kernel code and a GDT on each of the nodes, modifies base addresses of the kernel code segments on the respective nodes in the GDT to different linear addresses, and writes a mapping relation between the linear addresses and physical addresses of the nodes in a kernel page table, to enable a process to access the kernel code locally in the respective nodes; the present embodiment realizes multiple copies of the kernel using the segmentation technology, and when the process accesses the kernel code, the embodiment can directly obtain different linear addresses according to the contents of the GDT on the nodes, which are in turn mapped to different physical addresses based on the paging mechanism, without the necessity of synchronizing the kernel page table on the nodes and the page table of the process, so as to avoid frequently modifying the contents of the page table when the process migrates among the nodes, thereby improving system performance.

Finally, it should be noted that the above-mentioned embodiments are only used to illustrate the technical solutions of the present application, but not a limitation thereto. Although the present application are described in detail with reference to the aforementioned embodiments, a person skilled in the art should understand that it is possible to modify the technical solutions described in the aforementioned embodiments, or to make equivalent substitution for part of the technical features therein. These modifications or substitutions will not make the essence of the corresponding technical solutions depart from the spirit and scope of the technical solutions in the embodiments of the present application.

The invention claimed is:

1. A data access processing method, comprising:
    copying a kernel code and a global descriptor table on a memory of each node of a plurality of nodes in Non Uniform Memory Access Architecture respectively;
    making base addresses of segments of the kernel code on the respective nodes in the global descriptor table respectively point to linear addresses of the kernel code corresponding to the respective nodes based on a virtual address of the kernel code, wherein the base addresses represent relative offsets of the locations in the global descriptor table of the kernel codes on the respective nodes; and
    recording a mapping relation between the linear addresses of the kernel code corresponding to the respective nodes and physical addresses of the respective nodes in a kernel page table respectively, to enable a process to access the kernel code locally in the respective nodes.

2. The method according to claim 1, further comprising:
    filling a base address of the global descriptor table in the respective nodes into a global descriptor table register of the respective nodes respectively.

3. The method according to claim 1, wherein, when the process accesses the kernel code on the nodes, the method further comprising:

mapping the virtual address of the kernel code to the linear address of the kernel code corresponding to the node according to the content of the global descriptor table on the node;

obtaining the physical addresses corresponding to the linear addresses of the kernel code according to the mapping relation between the linear addresses of the kernel code corresponding to the node and the physical addresses of the node recorded in the kernel page table; and accessing the kernel code on the node according to the physical address.

4. The method according to claim 1, wherein, when the process accessing the kernel code on the nodes is interrupted, the method further comprising:

looking up an interrupt vector corresponding to the interrupt application from an interrupt vector table, said interrupt vector carrying a segment descriptor of the kernel code in the global descriptor table on the node;

obtaining the linear addresses of the kernel code corresponding to the nodes according to the segment descriptor of the kernel code in the global descriptor table on the nodes;

obtaining the physical addresses corresponding to the linear addresses of the kernel code according to the mapping relation between the linear addresses of the kernel code corresponding to the nodes and the physical addresses of the node recorded in the kernel page table; and accessing the kernel code on the nodes according to the physical addresses.

5. A non-transient computer-readable recording medium with program instructions stored thereon, the program instructions, when being executed by a processor, causing the processor to perform the steps of:

copying a kernel code and a global descriptor table on a memory of each node of a plurality of nodes in Non Uniform Memory Access Architecture respectively;

making base addresses of segments of the kernel code on the respective nodes in the global descriptor table respectively point to linear addresses of the kernel code corresponding to the respective nodes based on a virtual address of the kernel code, wherein the base addresses represent relative offsets of the locations in the global descriptor table of the kernel codes on the respective nodes; and recording a mapping relation between the linear addresses of the kernel code corresponding to the respective nodes and physical addresses of the respective nodes in a kernel page table respectively, to enable a process to access the kernel code locally in the respective nodes.

6. The non-transient computer-readable recording medium according to claim 5, the program instructions, when being executed by the processor, further causing the processor to perform the step of:

filling a base address of the global descriptor table on the respective nodes into a global descriptor table register of the respective nodes respectively.

7. The non-transient computer-readable recording medium according to claim 5, the program instructions, when being executed by the processor, further causing the processor to perform the steps:

mapping, when a process accesses a kernel code on a node, the virtual address of the kernel code to a linear address of the kernel code corresponding to the node according to the content of the global descriptor table on the node;

obtaining a physical address corresponding to the linear address of the kernel code according to the mapping relation between the linear address of the kernel code corresponding to the node and the physical address of the node recorded in the kernel page table; and accessing the kernel code on the node according to the physical address.

8. The non-transient computer-readable recording medium according to claim 5, the program instructions, when being executed by the processor, further causing the processor to perform the steps of:

looking up, when an interrupt application accesses a kernel code on a node, an interrupt vector corresponding to the interrupt application from an interrupt vector table, the interrupt vector carrying a segment descriptor of the kernel code in the global descriptor table on the node;

obtaining a linear address of the kernel code corresponding to the node according to the segment descriptor of the kernel code in the global descriptor table on the node;

obtaining the physical address corresponding to the linear address of the kernel code according to the mapping relation between the linear address of the kernel code corresponding to the node and the physical address of the node recorded in the kernel page table; and accessing the kernel code on the node according to the physical address.

\* \* \* \* \*